United States Patent
Kuo et al.

(10) Patent No.: US 7,270,458 B2
(45) Date of Patent: Sep. 18, 2007

(54) CURVED LIGHT GUIDE SCREEN

(75) Inventors: Huei Pei Kuo, Palo Alto, CA (US); Lawrence M. Hubby, Jr., Palo Alto, CA (US); Steven L. Naberhuis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 11/263,727

(22) Filed: Nov. 1, 2005

(65) Prior Publication Data

US 2007/0097711 A1     May 3, 2007

(51) Int. Cl.
    *G02B 6/06*     (2006.01)
(52) U.S. Cl. .................... 362/559; 385/120
(58) Field of Classification Search ................ 362/559; 385/120
See application file for complete search history.

(56) References Cited

U.S. PATENT DOCUMENTS

| | | | | |
|---|---|---|---|---|
| 3,043,910 A * | 7/1962 | Hicks, Jr. | .................... | 348/804 |
| 3,402,000 A * | 9/1968 | Crawford | .................... | 385/116 |
| 3,644,922 A * | 2/1972 | James et al. | .................. | 345/32 |
| 4,693,552 A * | 9/1987 | Jeskey | .................... | 385/116 |
| 4,701,614 A | 10/1987 | Jaeger et al. | | |
| 4,929,048 A | 5/1990 | Cuypers | | |
| 5,053,765 A * | 10/1991 | Sonehara et al. | ...... | 340/815.43 |
| 5,381,502 A * | 1/1995 | Veligdan | .................... | 385/115 |
| 6,031,954 A * | 2/2000 | Higuchi | .................... | 385/120 |
| 6,195,016 B1 * | 2/2001 | Shankle et al. | ........ | 340/815.42 |
| 6,304,703 B1 * | 10/2001 | Lowry | .................... | 385/120 |
| 6,571,043 B1 * | 5/2003 | Lowry et al. | ................ | 385/120 |
| 6,618,528 B2 * | 9/2003 | Lowry | .................... | 385/120 |
| 6,618,529 B2 * | 9/2003 | Lowry | .................... | 385/120 |
| 6,636,675 B2 | 10/2003 | Soufiane | | |
| 6,835,679 B2 | 12/2004 | Bilanin et al. | | |

* cited by examiner

*Primary Examiner*—Hargobind S. Sawhney

(57) ABSTRACT

Provided is a curved light guide screen. A plurality of vertically aligned light guides are arranged into light guide magnifying layers. Spacers are disposed between any two adjacent light guide magnifying layers, proximate to the magnifying output ends, to position the magnifying layers and define an orientation for the magnifying output ends. A curved viewing surface is defined having a concave, convex or complex curvature shape depending on the size, shape and positioning of the spacers. The spacers may have a variety of shapes, and may be flexible, semi-rigid or rigid. A case houses the light guide magnifying layers and spacers, as well as an image source and associated lenses. A related method of making a curved light guide screen is also provided.

36 Claims, 9 Drawing Sheets

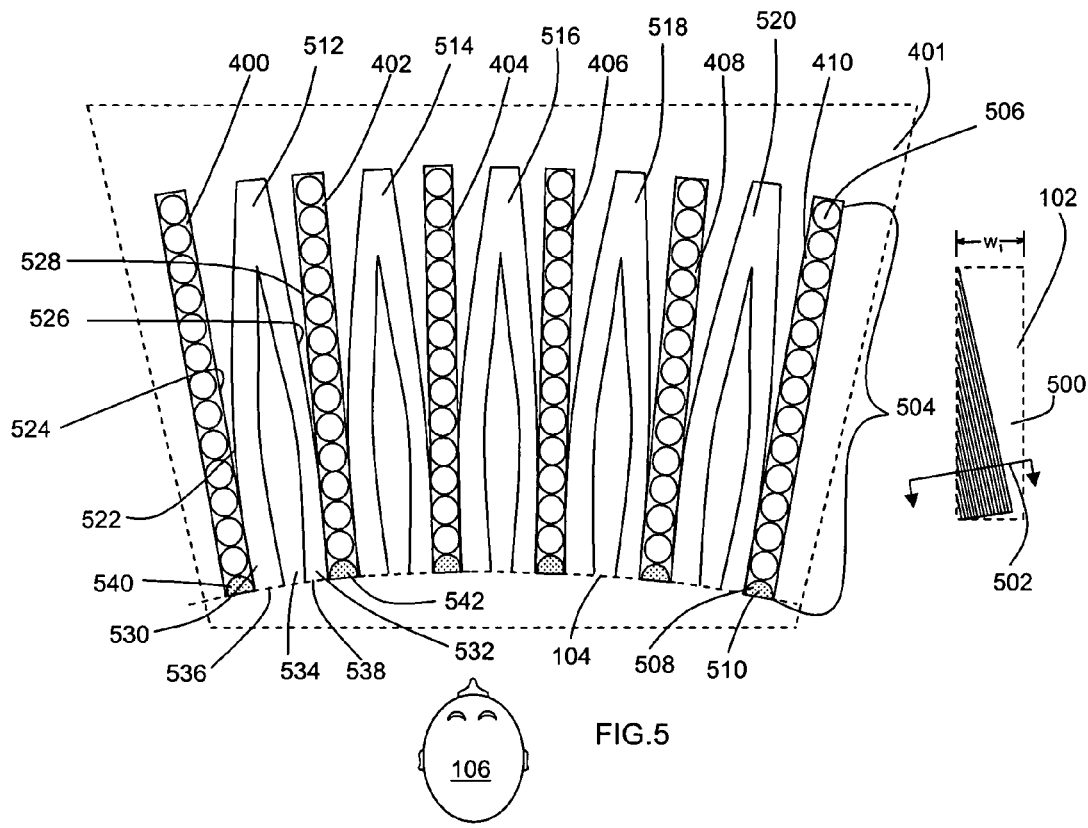
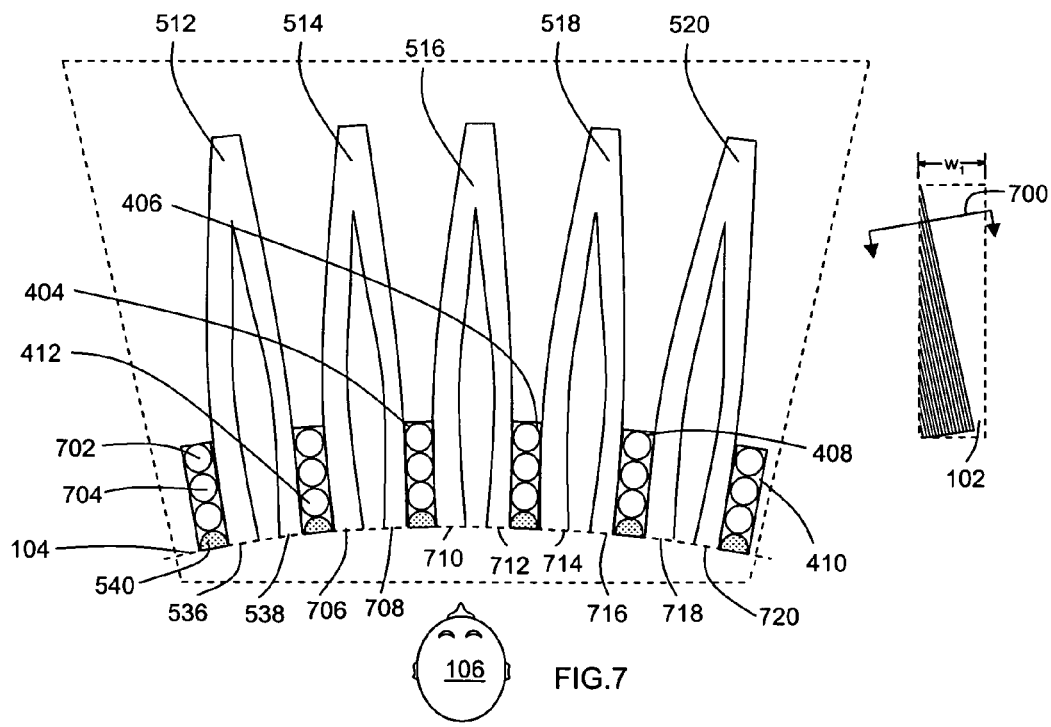

CURVED LIGHT GUIDE SCREEN

RELATED APPLICATIONS

This application is related to commonly owned U.S. patent application Ser. No. 10/698,829, filed on Oct. 31, 2003 and entitled "Light Guide Apparatus For Use In Rear Projection Display Environments", herein incorporated by reference.

FIELD

This invention relates generally to the field of display devices, and more particularly to a curved light guide screen for use in rear projection display devices.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments. The negative aspects of viewing angle and light variation may be amplified by the flat or planar geometry of current rear projection displays.

A display may also have to contend with two types of contrast—dark room contrast and light room contrast. Dark room contrast is simply the contrast between light and dark image objects in a dark environment such as a theater setting. Light room contrast is simply the contrast between light and dark image objects in a light environment. Front projection systems typically provide good dark room contrast where ambient light is minimized but, as they rely on a screen reflector, they are subject to poor light room contrast due to the interference of ambient light.

Rear projection displays, LEDs, LCDs and PDPs typically provide better light room contrast than front projection systems. However, ambient light striking the viewing surface can be an issue for viewers and buying consumers. Ambient light is oftentimes highly variable. For typical consumers, what makes a display attractive is often high contrast in a bright room. High contrast is difficult to achieve when ambient light strikes the viewing surface at specular or near-specular angles, as is common with flat panel displays.

A developing variation of rear projection displays utilizes light guides, such as optical fibers, to route an image from an input location to an output location and to magnify the image. Such displays may be referred to as light guide screens (LGS's). Light room contrast and dark room contrast are generally issues that also apply to LGS systems.

The light guides, commonly glass or acrylic, are typically manufactured as individual fibers or layers of fibers. The light guide fibers are flexible, and may be bent to accommodate design and manufacturing specifications. Further, precise positioning of each light guide is possible, and often required, to ensure optimal image quality.

Weight, thickness, durability, cost, aesthetic appearance and quality are key considerations for rear projection display systems and display screens. From the manufacturing point of view, cost of production and increased yield are also important.

Hence, there is a need for a rear projection display that overcomes one or more of the drawbacks identified above.

SUMMARY

This invention provides a curved screen for light guide screen displays.

In particular, and by way of example only, according to an embodiment of the present invention, provided is a curved light guide screen including: a plurality of magnifying layers, each magnifying layer including a plurality of light guides, and each light guide having an input end, a midsection and a magnifying output end; and a plurality of spacers disposed between two or more magnifying layers to position the layers and define a substantially curvilinear viewing surface.

BRIEF DESCRIPTION OF THE DRAWINGS

FIG. 5 is an enlarged top view of the section of the curved screen for a light guide display shown in FIG. 4, according to an embodiment;

FIG. 7 is an enlarged top view of a section of the curved screen for a light guide display shown in FIG. 4;

DETAILED DESCRIPTION

Before proceeding with the detailed description, it is to be appreciated that the present teaching is by way of example, not by limitation. The concepts herein are not limited to use or application with a specific curved light guide screen. Thus, although the instrumentalities described herein are for the convenience of explanation, shown and described with respect to exemplary embodiments, it will be appreciated that the principles herein may be equally applied in other types of curved light guide screen display systems.

Figure 1:
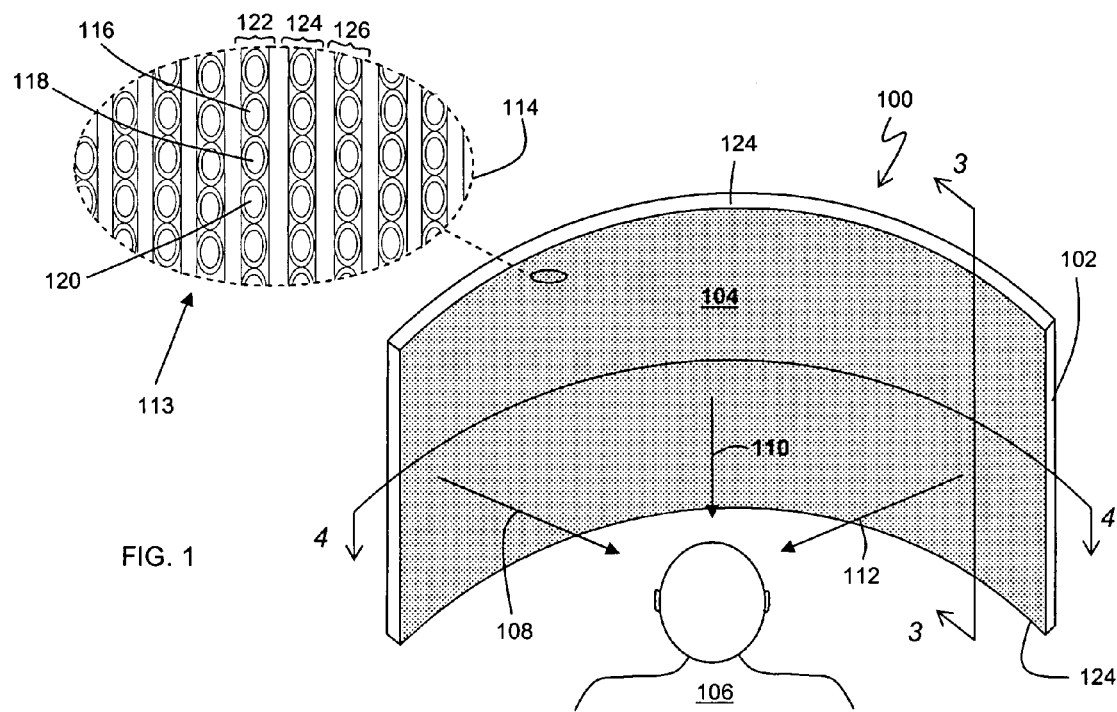
FIG. 1 is a perspective view of a curved screen for a light guide display, according to an embodiment.

Referring now to the drawings, and more specifically to FIG. 1, there is shown a curved light guide screen 100. Light guide screen 100 may be concave as shown in FIG. 1, it may be convex, or it may have a more complex curvature. In at least one embodiment, curved light guide screen 100 is part of a rear projection display such as that shown in FIG. 14, and may include a case 102 for housing curved light guide screen 100, an image source 1402 (FIG. 14), one or more lenses 1406 (FIG. 14), and/or other components. Curved light guide screen 100 may be a small sized screen, on the order of a personal computer screen or small gaming device. Alternatively, curved light guide screen 100 may be much larger, for example the size of a typical television, an HDTV screen or larger.

As shown in FIG. 1, a curvilinear viewing surface 104 is oriented toward an observer 106. Curvilinear viewing surface 104 is constructed from a plurality of light guides 200 (FIG. 2) which may number in the thousands. The magnifying output ends of each light guide, when considered as a collective whole, constitute curvilinear viewing surface 104. As represented by arrows 108, 110 and 112, each magnifying output end of each individual light guide is oriented substantially in the direction of observer 106.

In enlarged section 113, bounded by dotted line 114, of curvilinear viewing surface 104, the position, shape and orientation of a collection of light guide magnifying output ends may be more fully appreciated. Specifically, in at least one embodiment, the column of exemplary magnifying output ends 116-120, and their corresponding linearly aligned light guides above and below constitute a single light guide magnifying layer 122. In at least one embodiment, curved light guide screen 100 is an assembly of light guide magnifying layers, e.g. magnifying layers 122, 124 and 126, positioned and spaced adjacent one another as discussed in greater detail below.

As shown in enlarged section 114, in at least one embodiment, the magnifying output ends 116, 118, 120 of exemplary magnifying layer 122 are in substantially contiguous parallel contact, without intervening spacers or material separating each individual output end from it's neighbors above and below. In other words, the output ends lie adjacent one another and are in actual contact, touching along their outer surfaces at one or more points. It is of course understood and appreciated that the core (see FIG. 2) of each light guide are not in contact, rather it is the cladded outer surfaces that are in contact. Moreover, over the course of each entire length, the core of one light guide will not contact the core of another light guide.

Figure 2:
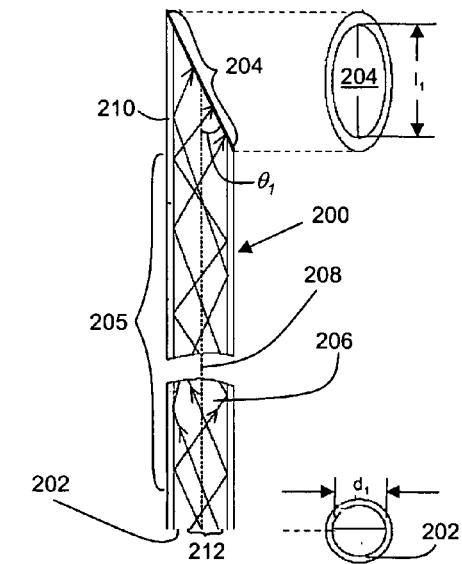
FIG. 2 is an enlarged cross-sectional view of a portion of a light guide, according to an embodiment.

Cross-referencing for a moment FIG. 1 with FIG. 2, each light guide 200 has an input end 202, an output end 204 and a midsection 205 therebetween. Each light guide 200 has a longitudinal light guide core 206 about longitudinal centerline 208. In at least one embodiment a circumferential clad 210 about core 206 provides total internal reflection properties to light guide 200, such that substantially all light, illustrated as arrows 212, presented to input end 202 is delivered to output end 204. For ease of illustration and understanding the light rays 212 are shown as following generally straight paths entering or leaving the light guide 200. It is to be understood and appreciated that the light rays 212 undergo a change of direction governed by the Fresnel law of refraction at the interfaces. This slight change in direction is well understood and does not alter the advantageous features of the disclosed embodiments.

Total internal reflection, or TIR, is the reflection of all incident light off a boundary between core 206 and clad 210. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of 90 degrees (that is, the light propagates along the boundary) when the light impinges on the boundary from the side of the higher index of refraction. For any angle of incidence greater than the critical angle, the light traveling through the medium with a higher index of refraction will undergo total internal reflection. The value of the critical angle depends upon the combination of materials present on each side of the boundary.

In at least one embodiment, for each light guide 200, a substantially circular cross-section input end 202 transitions to a substantially elliptical cross-section, magnifying output end 204. The interior diameter "$d_1$" of input end 202 is not as great as the major axis "$l_1$" of magnifying output end 204. Moreover, the magnification property of magnifying output end 204 is provided in at least one embodiment by configuring magnifying output end 204 at an acute angle "$\theta_1$" relative to longitudinal centerline 208 of light guide 200.

In at least one alternative embodiment, light guide 200 may have input and magnifying output end cross-sections relating to a square, triangle, trapezoid, octagon or other polygon. In addition, in at least one embodiment, the midsection 205 is a flexible midsection. As such, it is understood and appreciated that light guide 200 may bend and twist such that longitudinal centerline 208 is not always a straight line.

Figure 3:
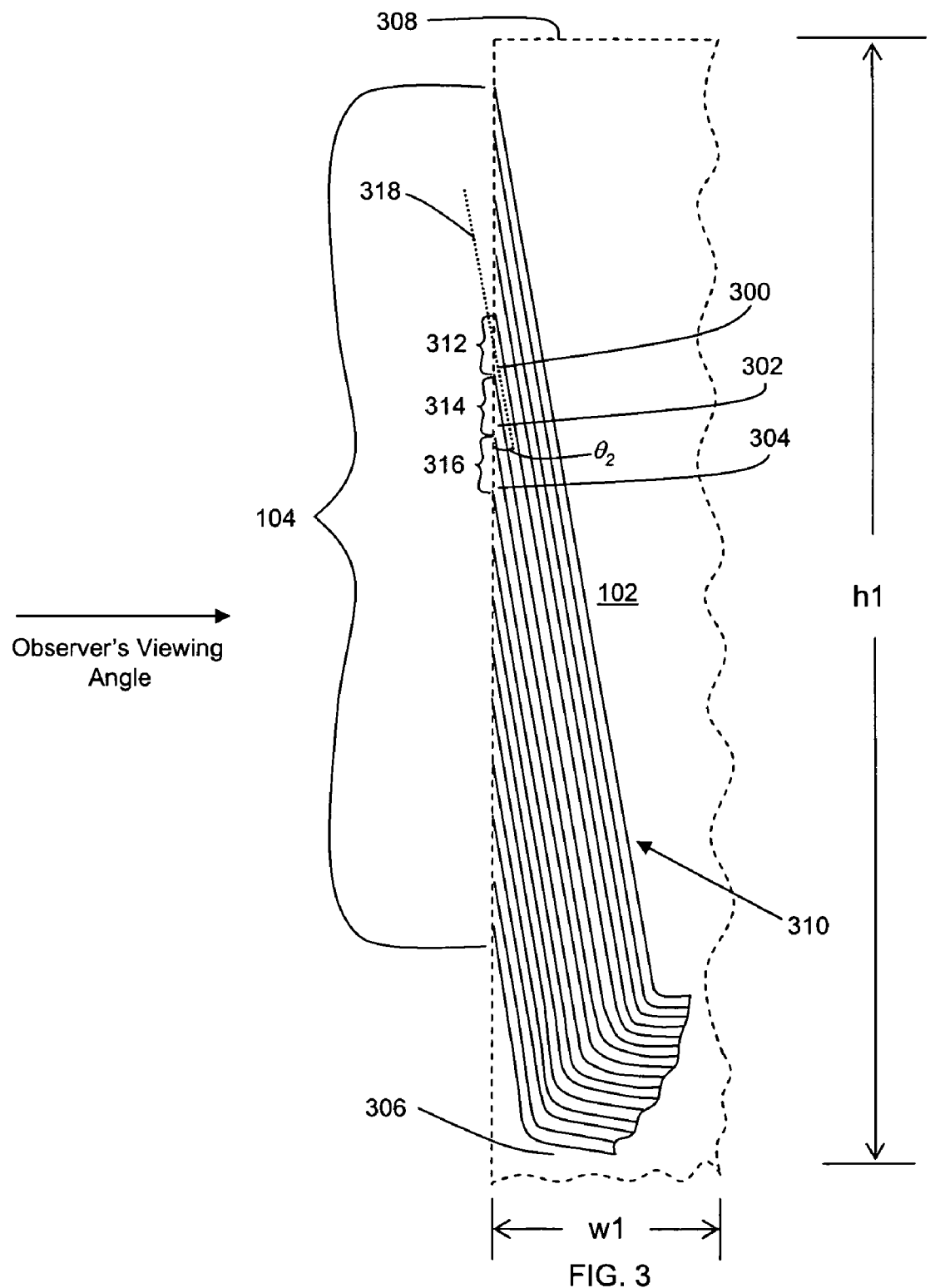
FIG. 3 is a partial end view of a curved screen for a light guide display according to an embodiment.

As shown in FIG. 3, each magnifying layer 310 of curved light guide screen 100 has a plurality of light guides, of which light guides 300, 302, and 304 are exemplary. In at least on embodiment, the light guides 300-304, and thus each magnifying layer 310 are oriented substantially vertically. Stated differently, light guides 300-304 extend from substantially a bottom region 306 of case 102 toward a top surface 308 of the case 102. The actual width "$w_1$" and height "$h_1$" of case 102 are defined, in part, by the number of light guides, e.g. light guides 300-304 required for each light guide magnifying layer 310. Further, the size and position of other LGS components, such as the image source 1402 in FIG. 14, may also dictate case 102 dimensions.

As shown, the magnifying output ends 312, 314 and 316, of light guides 300, 302 and 304 respectively, are oriented at an acute angle "$\theta_2$" relative to a centerline 318 of light guide 300. Collectively, magnifying output ends, e.g. ends 312-316, form viewing surface 104.

Figure 14:
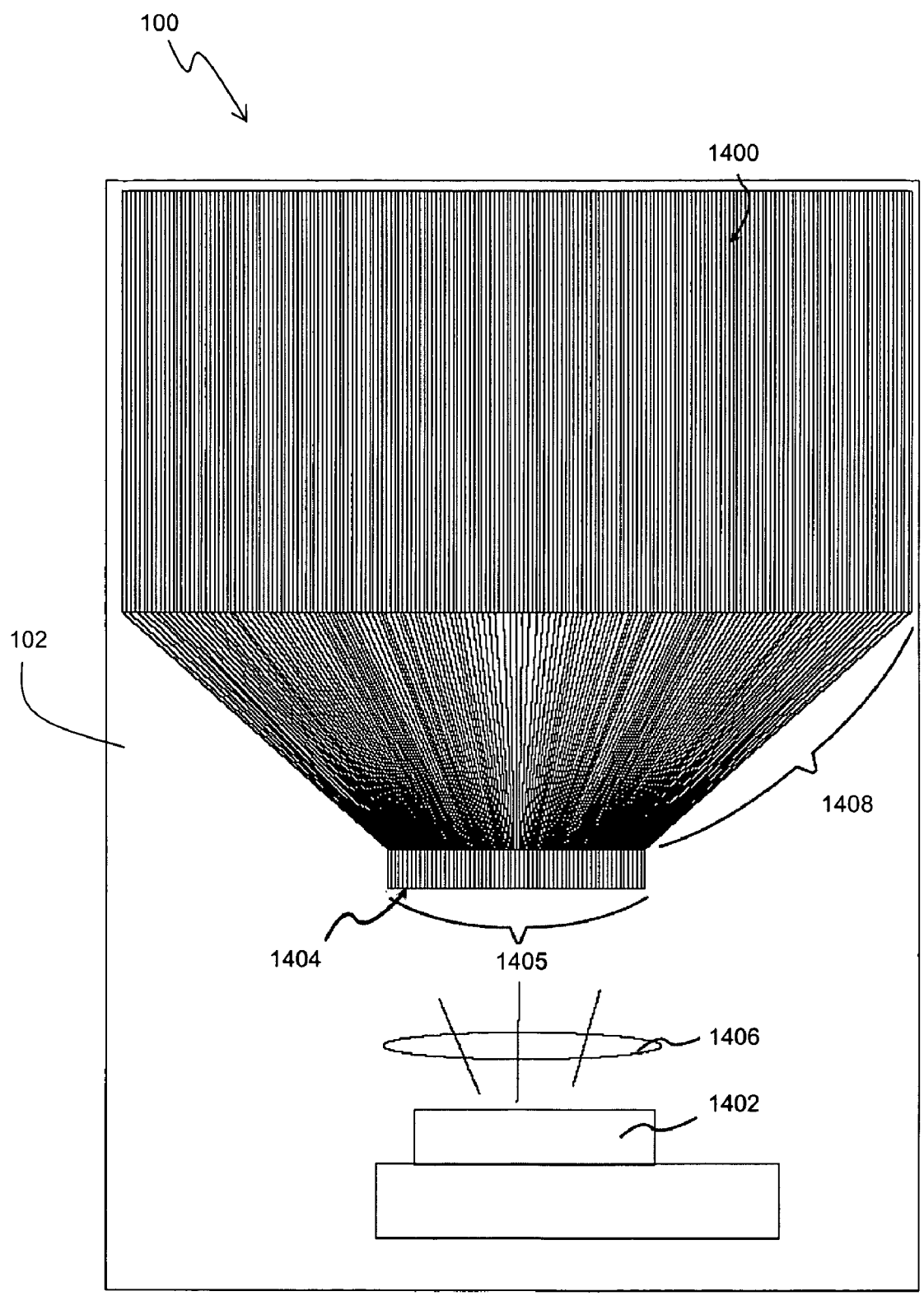
FIG. 14 is a schematic diagram of a curved light guide screen and enclosing case according to an embodiment.

The input ends of all light guides, e.g. light guides 300-304, are brought together to form an input surface 1405 (FIG. 14). The manner in which the input ends of all light guides, e.g. light guides 300-304, are integrated into the LGS is more clearly shown in FIG. 14. For embodiments employing a flexible midsection 205 (FIG. 2) for each light guide 300~314, each layer 310 is flexible as well, allowing each magnifying layer 310 to be bent and formed so as to fit within case 102.

Figure 4:
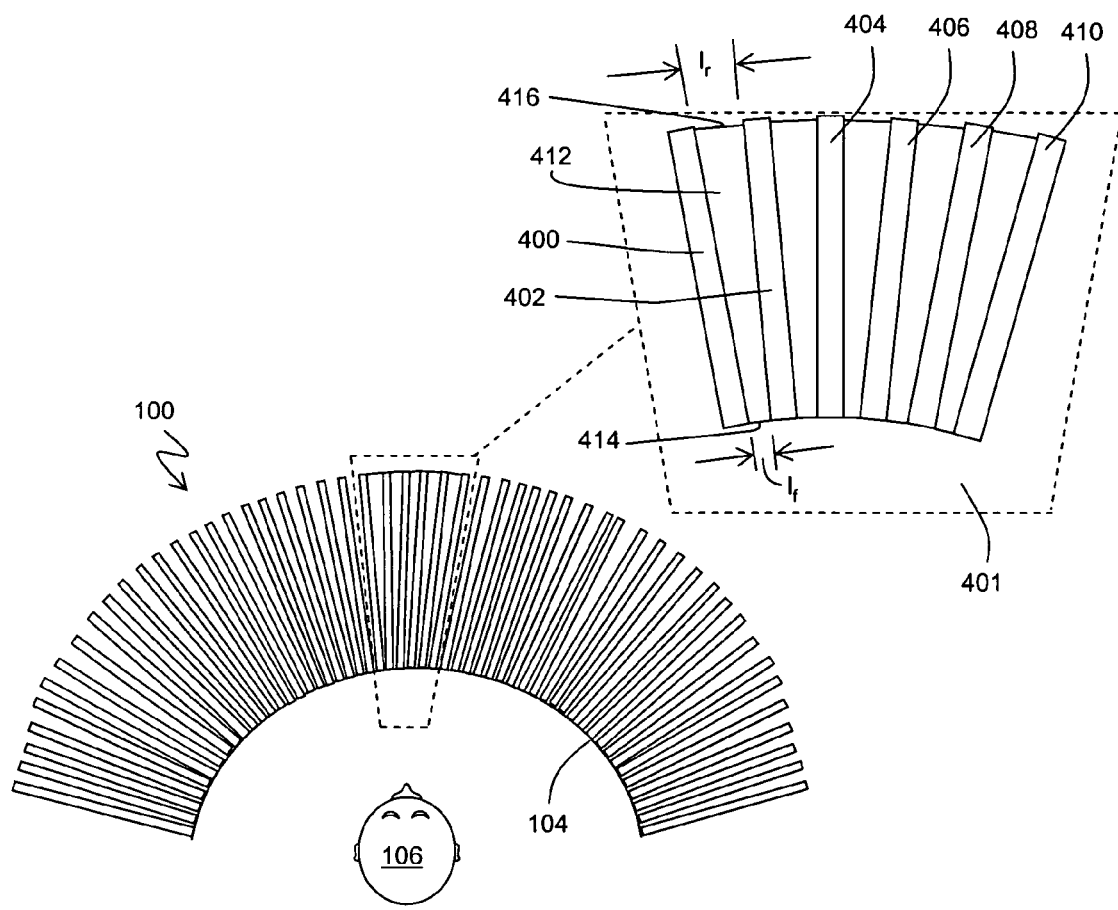
FIG. 4 is a top view of the curved screen for a light guide display shown in FIG. 1, with an enlarged view of individual light guide magnifying layers.

Turning to FIG. 4, presented is an enlarged top view 401 of a portion of curved light guide screen 100. It can be appreciated that the size and spacing of the light guide magnifying layers and spacers in FIG. 4 are exaggerated for ease of illustration and the benefit of explanation.

Typically, each light guide magnifying layer, e.g. magnifying layers 400, 402, 404, 406, 408 and 410, has a width equal to the width of one light guide. In at least one embodiment, the width of the light guide is typically 50-200 micrometers. In at least one embodiment, curved light guide screen 100 consists of a plurality of individual light guide magnifying layers 400-410. Spacers are used to control the distance between light guide magnifying layers 400-410, and the contour of the curvilinear viewing surface 104. More specifically, the center-to-center distance between any two magnifying layers 400-410 may be controlled, thereby controlling the perceived magnification of a projected image. In at least one embodiment, the center-to-center spacing is controlled such that the magnification across the curvilinear viewing surface 104 is constant. The spacers in FIG. 4, of which spacer 412 is exemplary, may be solid, wedged shaped spacers used to establish a fixed curvature of viewing surface 104. Other spacer designs may be employed, as discussed in greater detail below.

In one embodiment, the lengths "$l_f$" of the front surfaces of each spacer, e.g surface 414, are equal to each other, as are the lengths "$l_r$" of the rear surfaces, e.g. surface 416. Of note, if "$l_f$" is greater than "$l_r$", viewing surface 104 is generally convex, however, if "$l_f$" is less than "$l_r$", a concave shaped viewing surface 104 results. If all lengths "$l_f$" are the same, and the lengths "$l_r$" vary, a viewing surface 104 with a curvilinear shape with varying radius of curvature is established. In at least one embodiment, the length "$l_f$" is selected such that the center-to-center distance between magnifying layers 400-410 in a circumferential direction is substantially equal to the elliptical elongation of the output end (e.g. output end 116 in FIG. 1) of a light guide to establish an isotropic magnification. In this way, the curve of curvilinear viewing surface 104 is established while the spacing between magnifying output ends or pixels on curvilinear viewing surface 104 is optimized for viewing clarity. The section of curved light guide screen 100, i.e. section 401, is enlarged yet again in FIG. 5.

As shown in reference diagram 500, curved light guide screen 100 is sectioned along line 502 to render the view presented in FIG. 5. Each light guide magnifying layer 400-410 consists of a plurality of light guides, such as the group 504 of light guides for light guide magnifying layer 410. In the example illustrated, the cut along line 502 results in a circular cross-section, e.g. cross-section 506, for all but one of the group 504 of light guides extending vertically. Light guide 508, whose magnifying output end 510 is part of curvilinear viewing surface 104, has an elliptical shaped magnifying output end 510, only a portion of which is visible in the view of FIG. 5.

Still referring to FIG. 5, a spacer 512 is positioned between, and joined to, adjacent light guide magnifying layers 400 and 402. Similarly, spacers 514, 516, 518 and 520 are positioned to separate light guide magnifying layers 402-410, one from another. More specifically, a plurality of spacers (e.g. spacers 512~520) are disposed between the magnifying layers (e.g. magnifying layers 400~410) to position the layers and define a substantially curvilinear viewing surface 104.

Each spacer, provides two non-parallel surfaces, such as for example sides 522 and 526 of spacer 512. There is at least one point of contact between a side 522 of spacer 512 and a side 524 of light guide magnifying layer 400. Similarly, a second side 526 of spacer 512 contacts a side 528 of light guide magnifying layer 402. As with light guide magnifying layer 400, there are one or more points of contact between spacer side 526 and side 528. Spacers 512-520 may be joined to respective magnifying layers 402-410 at or near the magnifying output ends, e.g. output end 510. The shape of spacer 512 is optimized to provide maximum contact while maintaining the desired spacing between light guide magnifying layers 400 and 402.

In particular, for the embodiment illustrated, spacer 512 has a substantially inverted "V"-shaped outline with legs 530 and 532 of spacer 512 shaped and curved as desired to establish/maintain contact with light guide magnifying layers 400 and 402 respectively. The "open end" 534 of the inverted "V" is toward curvilinear viewing surface 104. In this configuration, spacer 512 is tapered, and more specifically spacer 512 tapers away from viewing surface 104. In at least one alternative embodiment, as shown for example in FIGS. 8 and 9, the spacers taper toward viewing surface 104.

With respect to FIGS. 5 and 7, ends 536 and 538 of legs 530 and 532 respectively are substantially aligned with the magnifying output ends providing curvilinear viewing surface 104, e.g. magnifying output ends 540 and 542. In this manner, a continuous, curvilinear viewing surface 104 is presented to an observer 106. In at least one embodiment, spacer 512 is bonded in at least one location to magnifying layers 400 and 402, and may be bonded in close proximity to magnifying output ends 540 and 542.

Figure 6:
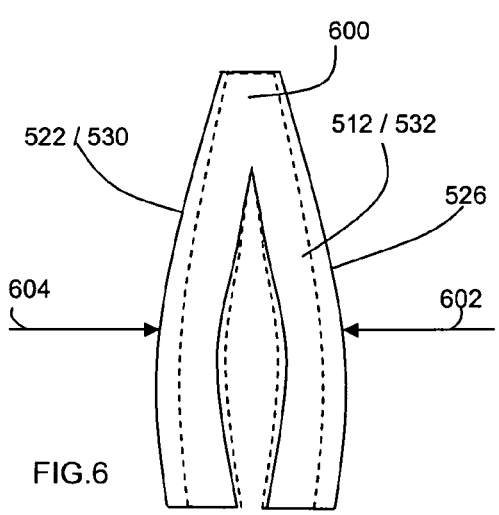
FIG. 6 is a top view of an "inverted" "V" spacer, according to an embodiment'

Cross-referencing for a moment FIG. 5 with FIG. 6, the flexibility of spacers 512-520 is highlighted. The spacers 512-520 may be made of a rigid material, however, they may also be made of a semi-rigid or flexible material. The shape of semi-flexible and flexible spacers may be changed with pressure. Moreover, spacer 512 may be described as having a first segment and a second segment (legs 530 and 532) that are joined by a center section 600. One or both legs (530, 532) may be bent in either of two opposing directions to change the shape of the spacer. In at least one embodiment the spacers 512-520 are shape-retaining, which is to say they retain their shape after pressure has been applied to bend or contort each spacer 512-520, and then removed.

In at least one alternative embodiment, spacers 512-520 retain their shape solely while pressure, represented by arrows 602 and 604 in FIG. 6, is applied. In this configuration, curvilinear viewing surface 104 is fully flexible and the curvature of viewing surface 104 may be changed during use. Regardless of being semi-ridge or flexible, spacers 512-520 can be shaped to ensure contact with light guide magnifying layers 400-410, and to ensure the proper spacing to establish and maintain the radius of curvature of curvilinear viewing surface 104. As stated above, each spacer 512-520 may be bonded at one or more contact points to the corresponding magnifying light guide layers 400-410.

In FIG. 7, a section cut 700 is taken through curved light guide screen 100 closer to top surface 308 (see FIG. 3). As can be seen in FIG. 7, a fewer number of light guides, e.g. light guides 702 and 704, are visible in the top view of each light guide magnifying layer 400-410. None the less, tapered spacers 512-520 continue to establish and maintain the spacing between magnifying layers 400-410. As shown in both FIGS. 5 and 7, in at least one embodiment, spacers 512-520 extend for nearly the entire width "$w_1$" of case 102. The ends 536 and 538 of spacer 512, as well as ends 706, 708, 710, 712, 714, 716, 718 and 720 are still oriented substantially toward curvilinear viewing surface 104 and observer 106.

It can be appreciated by referring to FIGS. 5 and 7 that in at least one embodiment, spacers 512-520 are either semi-rigid or rigid. Stated differently, spacers 512-520 preferably maintain an established shape in order to maintain the proper position and spacing of ends 536, 538 and 706-720. In one embodiment, viewing screen 104 is user configurable by establishing, in part, the shape and contour of spacer arms, and position of spacers 512-520.

Figure 8:
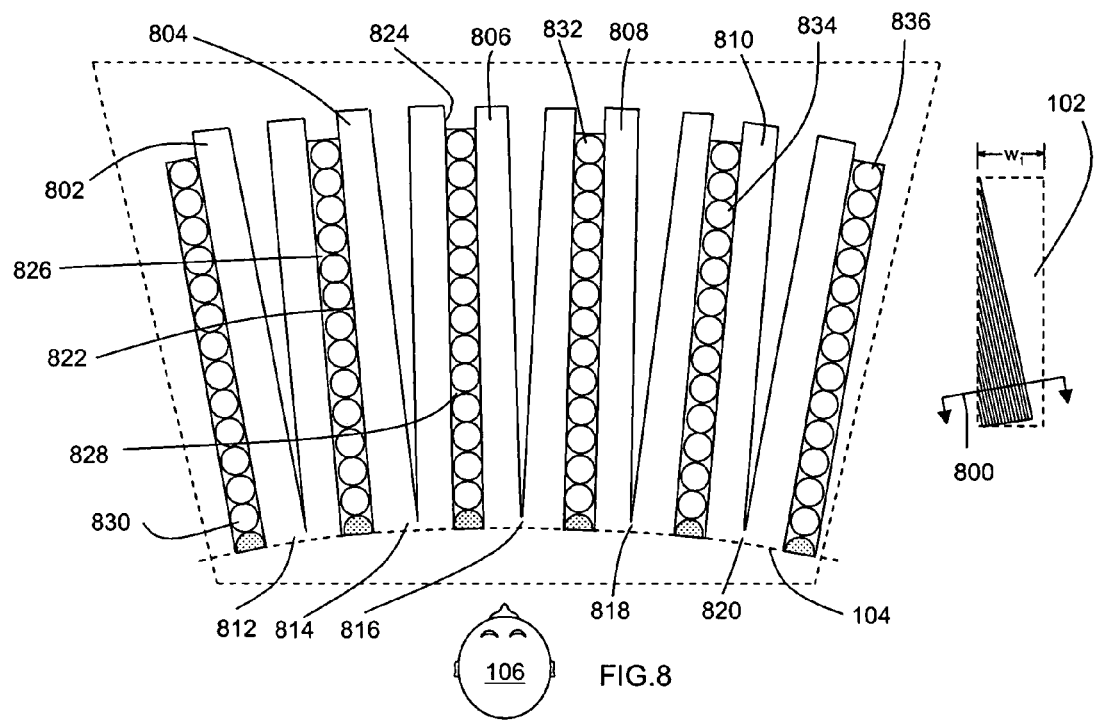
FIG. 8 is an enlarged top view of the section of the curved screen for a light guide display shown in FIG. 4, according to an embodiment.

In at least one embodiment, as an alternative to the inverted "V" spacer shown in FIG. 5, (e.g. spacer 512), the "V" shaped spacer may be reversed in orientation as shown in FIG. 8. The top view of FIG. 8 is similar to the top view of FIG. 5, cut along line 800 to show a majority of light guide magnifying layers. In particular, spacers 802, 804, 806, 808 and 810 each have a closed end of the "V", i.e. closed ends 812, 814, 816, 818, and 820 respectively, positioned in close proximity to curvilinear viewing surface 104.

Moreover, spacers 802~810 may be viewed as being tapered spacers. Each spacer provides two non-parallel surfaces, such as sides 822 and 824 in the case of spacer 804. As shown, the narrow end of the spacer points towards the curvilinear viewing surface 104. Although shown as a "V" with an open rearward section, in at least one alternative embodiment, spacers 802~810 may be substantially solid wedges, tapering towards the curvilinear viewing surface 104.

The sides of any given spacer positioned between two light guide magnifying layers are still in contact with the two adjacent light guide magnifying layers. For example, in FIG. 8 sides 822 and 824 of spacer 804 contact and are bonded to light guide magnifying layers 826 and 828 respectively. Similar to the view of section 401 in FIG. 5, spacers 802-810 extend for substantially the entire width "$w_1$" of case 102, and each spacer 802-810 may contact two light guide magnifying layers 826-836 at one or more points of contact along the length of the light guide magnifying layer.

Figure 9:
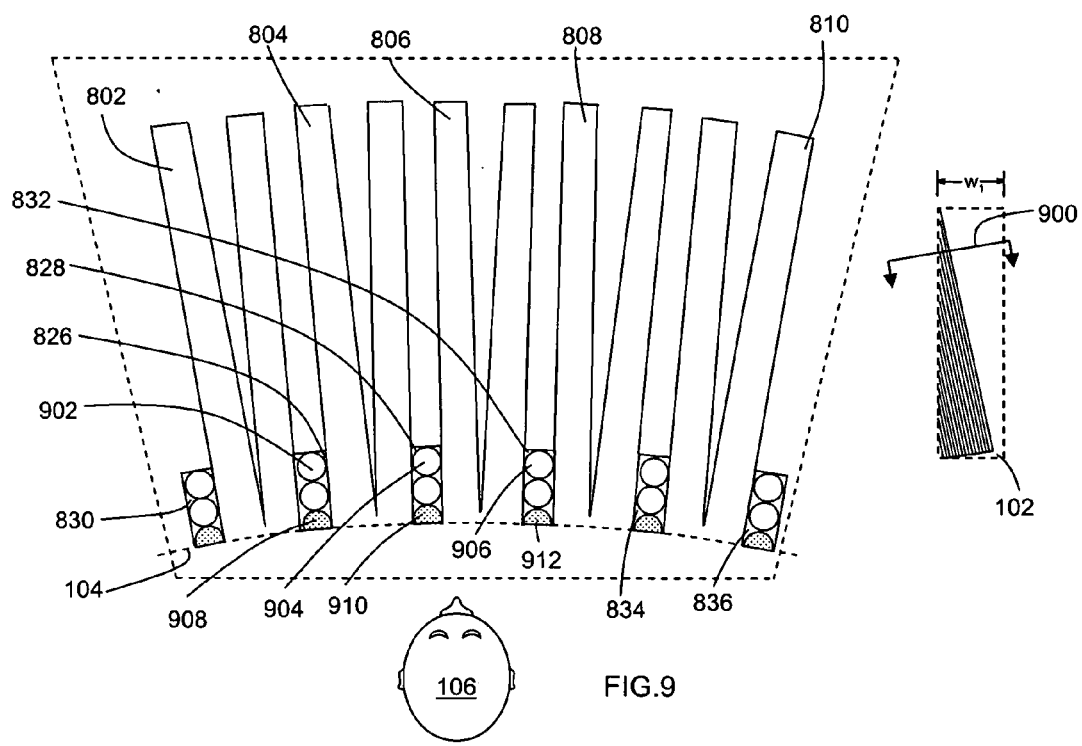
FIG. 9 is an enlarged top view of a section of the curved screen for a light guide display shown in FIG. 4.

Use of semi-rigid or rigid spacers in at least one embodiment is highlighted once again in FIG. 9. In FIG. 9, a top view through section cut 900 provides yet another perspective of the position of "V" spacers 802-810 relative to light guide magnifying layers 826 and 828, as well as light guide magnifying layers 830, 832, 834 and 836. Spacers 802-810 extend for substantially the entire width "$w_1$" of case 102.

In contrast to FIG. 8, all but a few light guides, e.g. light guides 902, 904 and 906, have already terminated at curvilinear viewing surface 104. In at least one embodiment, semi-rigid or rigid spacers 802-810 are employed to maintain the shape of curvilinear viewing surface 104. In at least one alternative embodiment, employing non-ridged or semi-rigid spacers 802~810, curvilinear viewing surface 104 is fully flexible and the curvature of viewing surface 104 may be changed during use.

Figure 10:
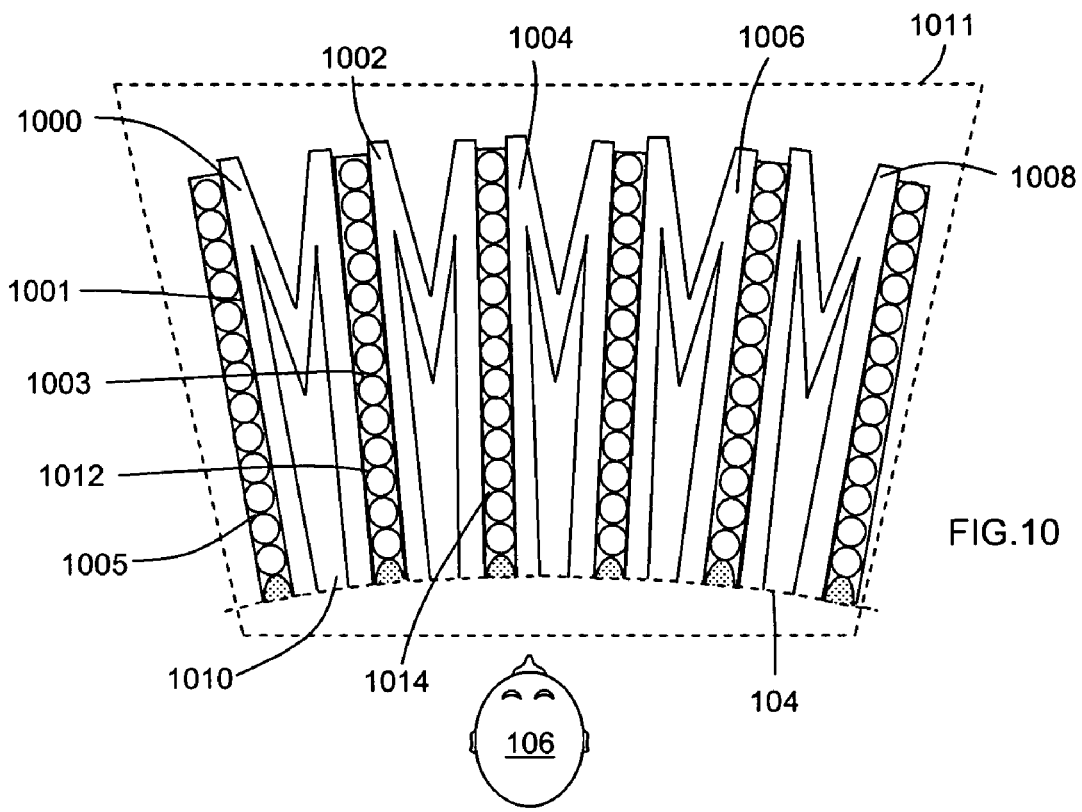
FIG. 10 is an enlarged cut-away top view of the section of the curved screen for a light guide display shown in FIG. 4, according to an embodiment.

In at least one alternative embodiment, the spacers may have the shape of "W/M" or a "corrugated" shape as shown in FIG. 10. As in the above illustrations and description, each spacer, e.g. spacer 1000, provides two non-parallel surfaces, such as sides 1001 and 1003 of spacer 1000, at least a portion of which are joined to the adjacent magnifying layers, e.g. magnifying layer 1005.

In one embodiment, spacers 1000, 1002, 1004, 1006 and 1008 are positioned with an open end, e.g. open end 1010, positioned toward curvilinear viewing surface 104. Alternatively, the spacers 1000-1008 may be reversed (not shown) with open ends toward the rear 1011 of case 102 (FIG. 1). As in the above description of "V" spacers (512, 802), the "corrugated" shaped spacers 1000-1008 may be flexible, or they may be rigid/semi-rigid to support light guide screen 100 requirements.

It can be appreciated that a "corrugated" shaped spacer may be used to provide spacing that is substantially uniform between light guide magnifying layers, e.g. light guide magnifying layers 1012 and 1014. In this configuration, light guide magnifying layers 1012 and 1014 may be spaced further apart than with the use of a similar sized "V" shaped spacer.

Figure 11:
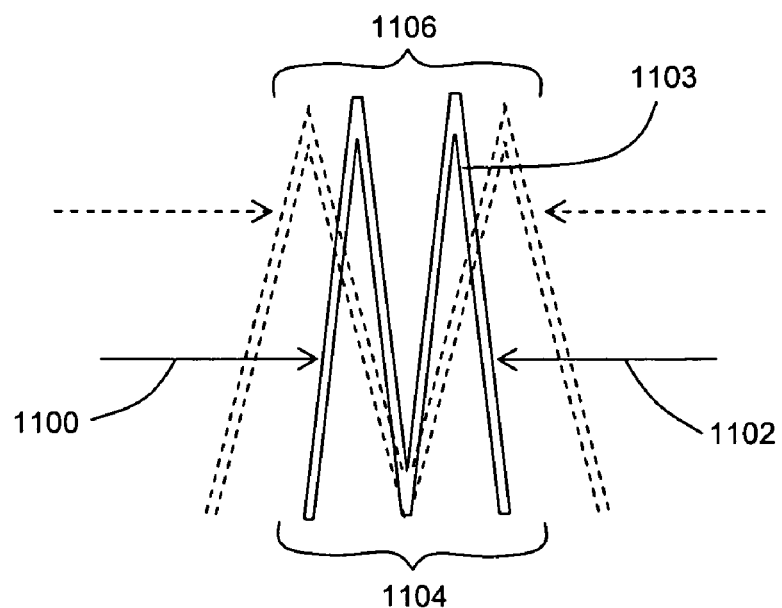
FIG. 11 is a corrugated spacer for a curved screen for a light guide display, according to an embodiment.

As with the "V" spacers discussed above, the shape of a "corrugated" shaped spacer may be permanently defined during manufacture of the spacer, or it may be changed by applying pressure to the spacer, as shown in FIG. 11. Pressure, represented by arrows 1100 and 1102, applied to a spacer 1103 will widen or narrow either the open end 1104 or the closed end 1106 of spacer 1103, depending on the point of application. In other words, the corrugated spacer may be expanded or collapsed to change the shape of the corrugated spacer. During the manufacturing and assembly process for light guide screen 100, the shape of the spacers, e.g. spacers 1000-1008 (FIG. 10) may be changed to fit the particular light guide screen 100 design or manufacturing plan.

Figure 12:
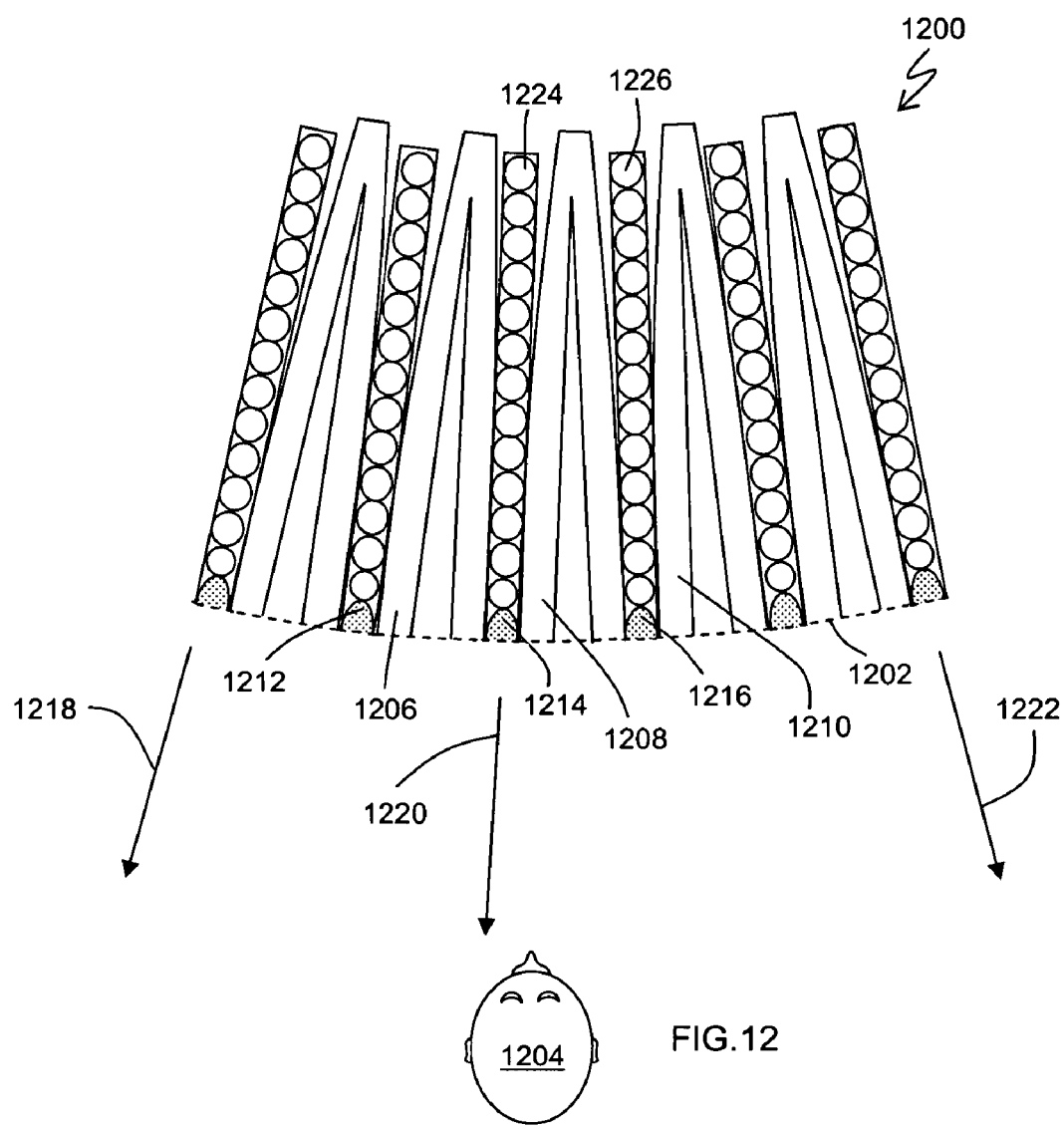
FIG. 12 is top view of a curved screen for a light guide display, according to an embodiment.

Referring now to FIG. 12, a section of a convex-shaped light guide screen 1200 is presented. As shown, the curvilinear viewing surface 1202 curves generally away from observer 1204. In this embodiment, inverted "V" shaped spacers are used, of which spacers 1206, 1208 and 1210 are exemplary. In at least one embodiment, the orientation of magnifying output ends, such as output ends 1212, 1214 and 1216, changes across the width of the curvilinear viewing surface 1202, as represented by arrows 1218, 1220 and 1222. For example, the orientation of magnifying output end 1212 is different than the orientation of magnifying output end 1216, and only magnifying output end 1214 is oriented substantially toward observer 1204.

Within a typical light guide 200 (see FIG. 2), such as, for example, an optical fiber, the spread of light to either side of the longitudinal centerline 208 is typically about 30 degrees (30°). Although the angle of the output end 204 may provide a surface transverse to an observer, exiting light will likely continue substantially in the direction last suggested by longitudinal centerline 208 unless reflected or refracted at output end 204.

In at least one embodiment where such redirection is desired, such redirection of light is accomplished with a light redirection layer. In at least one embodiment, the light redirection layer is a louver layer (not shown) which redirects light emitting from magnifying output ends 1212-1216 toward observer 106. A method for making a louver layer is described in patent application Ser. No. 11/052,612, filed Feb. 7, 2005, entitled "Method of Making A Louver Device for A Light Guide Screen", which is herein incorporated by reference. Various types of louver layers are described in patent application Ser. No. 11/052,605, filed Feb. 7, 2005, entitled "Holographic Louver Device for A Light Guide Screen," which is herein incorporated by reference.

In typical embodiments, as the light guide magnifying layers are fabricated as planar structures with parallel surfaces, it is the existence of the two non-parallel surfaces provided by the spacers which permit the advantageous curvilinear viewing surface 104 to be conformed as desired. In addition to the inverted "V" shaped spacers 1206-1210 shown in FIG. 12, spacers of various other shapes may be used to separate light guide magnifying layers, e.g. magnifying layers 1224 and 1226 in FIG. 12 or layers 402 and 404 in FIG. 5, and define the radius of curvature of a curvilinear viewing surface, e.g. surface 1202.

Figure 13:
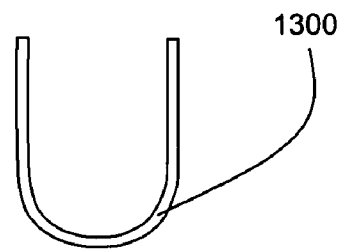
FIG. 13 is a "U" shaped spacer for a curved screen according to an embodiment.

These shapes may include the "V" shaped spacer, the "corrugated" spacer, a "U" shaped spacer 1300 (FIG. 13), or other spacers the geometry of which provide at least one point of contact between two non-parallel surfaces provided by the spacer and the two adjacent light guide magnifying layers. Further, spacers used to separate adjacent light guide magnifying layers may be manufactured as a solid component, or "wedge", as opposed to the "V" shaped spacers and others which have a space between two or more "legs" of the spacer.

In operation of curved light guide screen 100, an image is projected upon output curvilinear viewing surface 1400 (FIG. 14). Such an image may be provided in at least one embodiment by an image source 1402, proximate to an input face 1404. A lens 1406 may optically couple the at least one image source 1402 to the input face 1404 consisting of input ends 1405, or the lens 1406 may be an integral part of image source 1402.

Image source 1402 may be any device capable of providing a visual image, such as, for example, a projector. Image source 1402 is not limited simply to this example, and may also include combinations of devices. For example, multiple light/image sources (such as red, green and blue illuminated liquid crystal light vales) may be used as well.

It is appreciated that input face 1404 exposes a plurality of light guides 1408 to image source 1402. The plurality of light guides 1408 transmit an image generated by image source 1402 to the curvilinear viewing surface 1400 where a magnification of the image is projected toward one or more observers (not shown).

Figure 15:
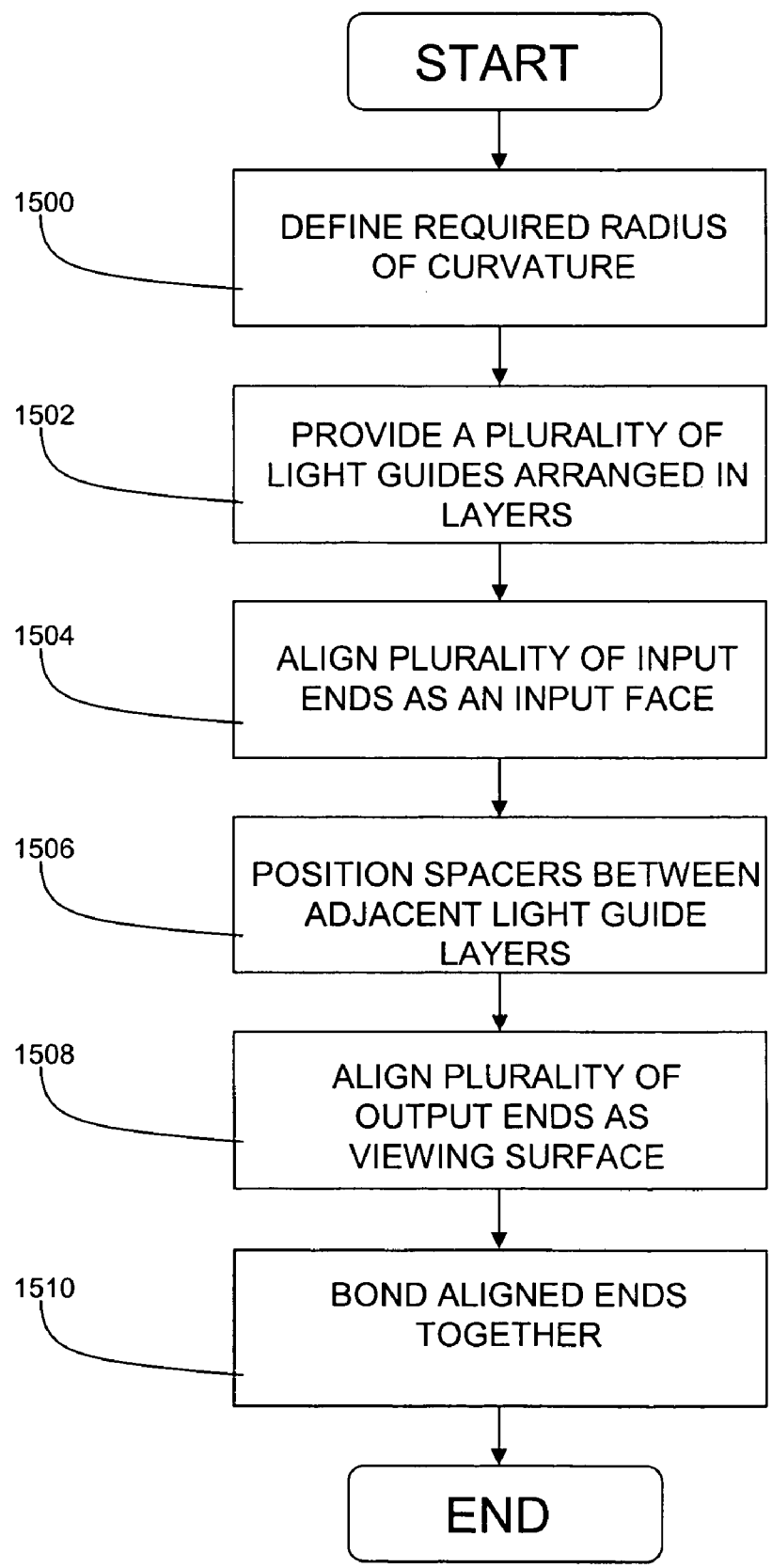
FIG. 15 is a flowchart of a method of making a curved light guide screen in accordance with an embodiment.

Having discussed the above physical embodiments of a curved light guide screen 100, an embodiment relating to a method of making a curved light guide screen 100 will now be summarized with reference to the flowchart of FIG. 15. It will be appreciated that the described method need not be performed in the order in which it is herein described, but that this description is merely exemplary of at least one method of making a curved light guide screen 100.

As indicated in block 1500, the fabrication process commences by defining the radius of curvature desired/required for the curved light guide screen 100. As stated previously, the curve may be concave, convex, or a more complex shape of varying radius of curvature depending on the desired use for the LGS system. Once the radii of curvature are defined, a plurality of light guides is provided, block 1502.

More specifically, in at least one embodiment the light guides, e.g. light guides 300-304 in FIG. 3, are arranged into a plurality of light guide magnifying layers such as magnifying layer 400 (FIG. 4). Each light guide magnifying layer 400 is one light guide thick. The magnifying output ends in each magnifying layer may be in substantially contiguous parallel contact.

The plurality of input ends are aligned as an input face, block 1504. Further, spacers, e.g. spacer 512 (FIG. 5), are positioned between each two adjacent light guide magnifying layers, e.g. magnifying layers 400, 402, (block 1506) to position and orient the magnifying layers and their respective magnifying output ends. The plurality of magnifying output ends are then aligned as a curvilinear viewing surface 104, block 1508. The aligned input ends are bonded together and the aligned magnifying output ends are bonded together, block 1510.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A curved light guide screen comprising:
 a plurality of magnifying layers, each magnifying layer including a plurality of light guides, and each light guide having an input end, a midsection and a magnifying output end; and
 a plurality of spacers disposed between two or more magnifying layers to position the layers and define a substantially curvilinear viewing surface, each spacer having two non-parallel surfaces, each surface providing at least one point of contact with an adjacent magnifying layer; wherein a radius of curvature of the curvilinear viewing surface varies, and further wherein a center-to-center spacing between magnifying output ends and a resultant image magnification is constant.

2. The curved light guide screen of claim 1, wherein for each layer the plurality of magnifying output ends are aligned in substantially contiguous parallel contact.

3. The curved light guide screen of claim 1, wherein at least one spacer is joined proximate to the magnifying output ends of each magnifying layer.

4. The curved light guide screen of claim 1, wherein the spacers are tapered.

5. The curved light guide screen of claim 4, wherein the narrower end of the tapered spacers points toward the curvilinear viewing surface.

6. The curved light guide screen of claim 4, wherein the narrower end of the tapered spacers points away from the curvilinear viewing surface.

7. The curved light guide screen of claim 1, wherein one or more spacers are solid wedges.

8. The curved light guide screen of claim 1, wherein one or more spacers are flexible after assembly.

9. The curved light guide screen of claim 1, wherein one or more spacers are corrugated, and further wherein each corrugated spacer can be expanded or collapsed to change the shape of the corrugated spacer.

10. The curved light guide screen of claim 1, wherein one or more spacers have a first segment and a second segment joined by a center section, and further wherein one or both segments can be bent in either of two opposing directions to change the shape of the spacer.

11. The curved light guide screen of claim 10, wherein one or more spacers are V-shaped.

12. The curved light guide screen of claim 1, further including a louver layer disposed between the output ends and the protective layer.

13. A curved light guide screen comprising:
a plurality of magnifying layers, each magnifying layer including a plurality of light guides, and each light guide having an input end, a midsection and a magnifying output end, all of the magnifying output ends within each layer aligned in substantially contiguous parallel contact; without intervening spacers or materials and
a plurality of spacers providing two opposing non-parallel surfaces disposed between two or more magnifying layers, each surface adjacent to a magnifying layer.

14. The curved light guide screen of claim 13, wherein one or more spacers are flexible after assembly.

15. The curved light guide screen of claim 13, wherein at least one spacer is joined to the magnifying output ends of each magnifying layer.

16. The curved light guide screen of claim 13, wherein the spacers are tapered.

17. The curved light guide screen of claim 13, wherein a radius of curvature of the curvilinear viewing surface varies, and further wherein a center-to-center spacing between magnifying output ends and a resultant image magnification is constant.

18. The curved light guide screen of claim 13, wherein one or more spacers are corrugated, and further wherein each corrugated spacer can be expanded or collapsed to change the shape of the corrugated spacer.

19. The curved light guide screen of claim 13, wherein for a first instance, the narrower end of the tapered spacer points away from the curvilinear viewing surface, and in a second instance the narrower end of the tapered spacer points towards the curvilinear viewing surface.

20. A method of making a curved light guide screen comprising:
providing a plurality of magnifying layers, each magnifying layer including a plurality of light guides, and each light guide having an input end, a midsection and a magnifying output end, all of the magnifying output ends within each layer aligned in substantially contiguous parallel contact; without intervening spacers or material and
disposing a plurality of spacers between two or more magnifying layers to position the layers and define a substantially curvilinear viewing surface.

21. The method of claim 20 further comprising joining at least one spacer to the magnifying output ends of each magnifying layer.

22. The method of claim 20 further comprising joining the spacers to the magnifying layers proximate to the output ends.

23. The method of claim 20 further comprising joining a louver layer to the curvilinear viewing surface.

24. The method of claim 20, wherein the spacers are solid wedges.

25. The method of claim 20, wherein the spacers are tapered.

26. The method of claim 20, wherein one or more spacers are flexible after assembly.

27. The method of claim 20, wherein one or more spacers are corrugated, and further wherein each corrugated spacer can be expanded or collapsed to change the shape of the corrugated spacer.

28. The method of claim 20, wherein one or more spacers have a first segment and a second segment joined by a center section, and further wherein one or both segments can be bent in either of two opposing directions to change the shape of the spacer.

29. The method of claim 20, wherein a radius of curvature of the curvilinear viewing surface varies, and further wherein a center-to-center spacing between magnifying output ends and a resultant image magnification is constant.

30. A curved light guide screen comprising:
a case;
a plurality of magnifying layers, each magnifying layer including a plurality of optical fibers, and each fiber having an input end, a midsection and a magnifying output end, all of the magnifying output ends within each layer aligned in substantially contiguous parallel contact; without intervening spacers or materials
a plurality of spacers placed between two or more magnifying layers to position the layers and define a substantially curvilinear viewing surface, each spacer provides two opposing non-parallel surfaces, each surface adjacent to a magnifying layer; and
at least one image source proximate to the plurality of input ends.

31. The curved light guide screen of claim 30, wherein at least one spacer is joined to the magnifying output ends of each magnifying layer.

32. The curved light guide screen of claim 30, wherein the spacers are solid wedges.

33. The curved light guide screen rear projection display of claim 30, wherein the spacers are tapered.

34. The curved light guide screen rear projection display of claim 30, wherein one or more spacers are flexible after assembly.

35. The curved light guide screen of claim 30, wherein a radius of curvature of the curvilinear viewing surface varies, and further wherein a center-to-center spacing between magnifying output ends and a resultant image magnification is constant.

36. The curved light guide screen of claim 30, wherein for a first instance, the narrower end of the tapered spacer points away from the curvilinear viewing surface, and in a second instance the narrower end of the tapered spacer points towards the curvilinear viewing surface.

* * * * *